United States Patent [19]

Koshi et al.

[11] Patent Number: 5,317,366

[45] Date of Patent: May 31, 1994

[54] PROCESSING UNIT AND SYSTEM INCLUDING PLURALITY OF THE PROCESSING UNITS

[75] Inventors: Makoto Koshi; Yoshihiko Kaiju, both of Kawasaki, Japan

[73] Assignee: Fujitsu Limited, Kawasaki, Japan

[21] Appl. No.: 63,049

[22] Filed: May 19, 1993

Related U.S. Application Data

[63] Continuation of Ser. No. 794,258, Nov. 19, 1991, abandoned.

[30] Foreign Application Priority Data

Nov. 20, 1990 [JP] Japan ................... 2-312782

[51] Int. Cl.⁵ ............................ G03G 21/00
[52] U.S. Cl. ................... 355/202; 355/282; 307/31; 361/87
[58] Field of Search ........ 355/202, 200, 282; 307/31–34, 38, 39; 361/87

[56] References Cited

U.S. PATENT DOCUMENTS

| | | | |
|---|---|---|---|
| 4,549,274 | 10/1985 | Lerner et al. | 307/39 X |
| 4,612,619 | 9/1986 | Culp | 307/31 X |
| 4,695,738 | 9/1987 | Wilmot | 307/31 |
| 4,855,922 | 8/1989 | Huddleston et al. | 307/38 X |
| 4,996,625 | 2/1991 | Soma et al. | 307/38 X |
| 5,043,595 | 8/1991 | Sugiyama | 307/39 |

FOREIGN PATENT DOCUMENTS

| | | | |
|---|---|---|---|
| 60-258624 | 12/1985 | Japan | G06F 1/00 |
| 61-156078 | 7/1986 | Japan | . |
| 63-95465 | 4/1988 | Japan | G03G 15/00 |
| 2-42455 | 2/1990 | Japan | G03G 15/00 |

*Primary Examiner*—R. L. Moses
*Attorney, Agent, or Firm*—Staas & Halsey

[57] ABSTRACT

A system including a plurality of processing units wherein one power source is connected to the plurality of processing units, is constituted such that when a total of maximum rated currents of the processing units exceeds an allowable current of the power source, an allowance or nonallowance of the power supplied to the processing units is determined from a state of the power source and the power supply is controlled thereby, and whereby the power source does not become overloaded. Thus, the system avoids overloading the power source if a sum of the maximum rated currents of respective connected processing units exceeds the allowable current of a power source.

11 Claims, 6 Drawing Sheets

PROCESSING UNIT AND SYSTEM INCLUDING PLURALITY OF THE PROCESSING UNITS

This application is a continuation of application No. 07/794,258, filed Nov. 19, 1991, now abandoned.

BACKGROUND OF THE INVENTION

1. Field of the invention

The present invention relates to a processing unit and a system including a plurality of the processing units and more particularly to a system including, for example, a plurality of electronic photo type printers wherein an overload of the power source is prevented.

2. Description of the Related Art

In a system wherein one power source supplies the power to a plurality of image processors, the connection by which the total of the respective, rated currents of the plurality of image processors exceeds the allowable current of the power source is not usually executed. If, for example, the total of the rated currents of the plurality of image processors is less than the allowable current of the power source and, by the addition of another image processor, the total of the rated currents exceeds the allowable current of the power source, the result is that the power source is disconnected by the over current condition, and the possibility thus occurs of the cessation of all the functions of the connected image processors. Generally the allowable current from a power supply terminal (outlet or the like) is about 15 amperes. If the connection of a plurality of image processors, each having a rated current of 8 amperes, is desired, the connection of more than one is dangerous for the above reason. At a time when information processing is popular, the above limitation of the connection of the processors is very inconvenient.

SUMMARY OF THE INVENTION

An object of the present invention is to avoid an overload of a power source if the sum of the respective, maximum rated currents of a plurality of processing units connected to a common power source exceeds the allowable current of the common power source.

According to a first aspect of the invention, there is provided a system including a plurality of processing units wherein one power source is connected to the plurality of processing units and wherein when the total of the respective, maximum rated currents of the processing units exceeds the allowable current of the power source, an allowance or nonallowance of the power to be supplied to the processing units is determined from the state of the power source and the supply of power to the individual processing units is controlled thereby such that the power source does not become overloaded.

According to a second aspect of the invention there is provided a processing unit comprising a device having a large power consumption; a voltage level of the power being supplied to the processing unit is measured inside the unit or outside the unit; and when the value of the voltage is less than a predetermined value, the power is not supplied to the device.

By using the above-mentioned system or unit, for example, the voltage level (i.e., of a predetermined value) which represents the electric current value for the allowable current of the power source, is obtained, and when the actual voltage level of the power source is less than the predetermined value, the power supply to the unit, to which hereafter the power will be supplied, is delayed, and when the power voltage has been restored to the predetermined value, the supply of power then starts, or resumes. In executing the above, even when the total of the respective, maximum rated currents of the plural units exceeds the allowable current of the power source, overloading of the power source can be avoided.

Other features and advantages of the invention will be apparent from the following description given with reference to the accompanying drawings.

DESCRIPTION OF THE PREFERRED EMBODIMENTS

Prior to the explanations of the embodiments, as an example of a processing unit to which the present invention is applied, an electronic photo type printer is explained with reference to the drawings and after that, problems in the conventional arts are stated.

Figure 3:
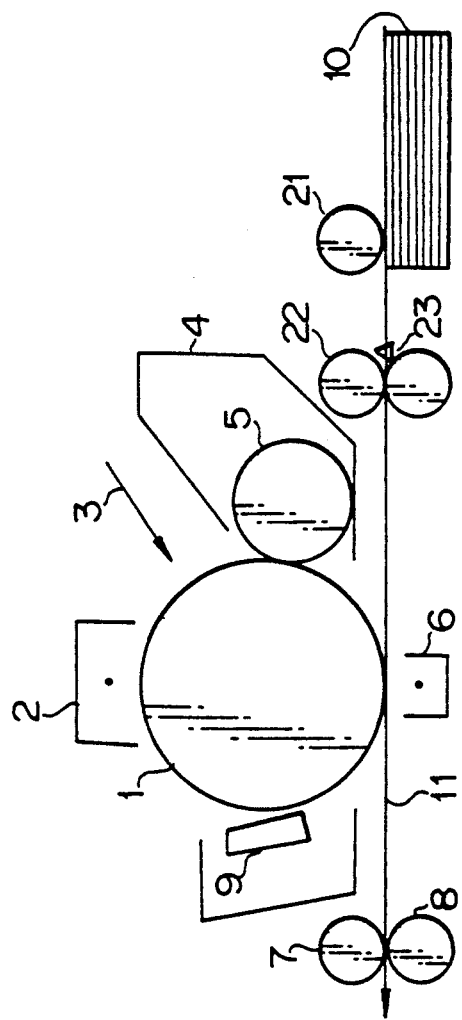
FIG. 3 is an explanatory and schematic diagram summarizing the components of an electronic photo type printer.

The electronic photo printer, shown in FIG. 3, forms an electronic photo image on a photosensitive drum 1, which is rotatable and has an optically conductive material thereon, and further comprises a precharge unit 2, an image exposure portion 3, a developing unit 4, developing roller 5, and the like, and which functions by the Carlson method. Then, the printer transfers the visual image to a transferring medium 11 using a transfer unit 6, fixes the image by a fixing unit (fixing roller, pressure roller 8), and obtains a permanent image on the transferring medium 11.

The transferring medium (paper) 11 is drawn from a paper try 10 by a pick roller 21, arrives at a resist roller 22, and waits for the next process. Slightly upstream from the resist roller 22, a paper position sensor 23 is provided. Before entering the transferring portion, a pushing roller (not shown) is provided to push the paper 11 to the photosensitive drum 1.

After the developed image (not shown) is transferred to the transferring medium 11, a toner (black particles) remaining on the photosensitive drum 1 is cleared by the cleaner 9, and the photosensitive drum 1 is ready for the next image forming cycle.

Figure 4:
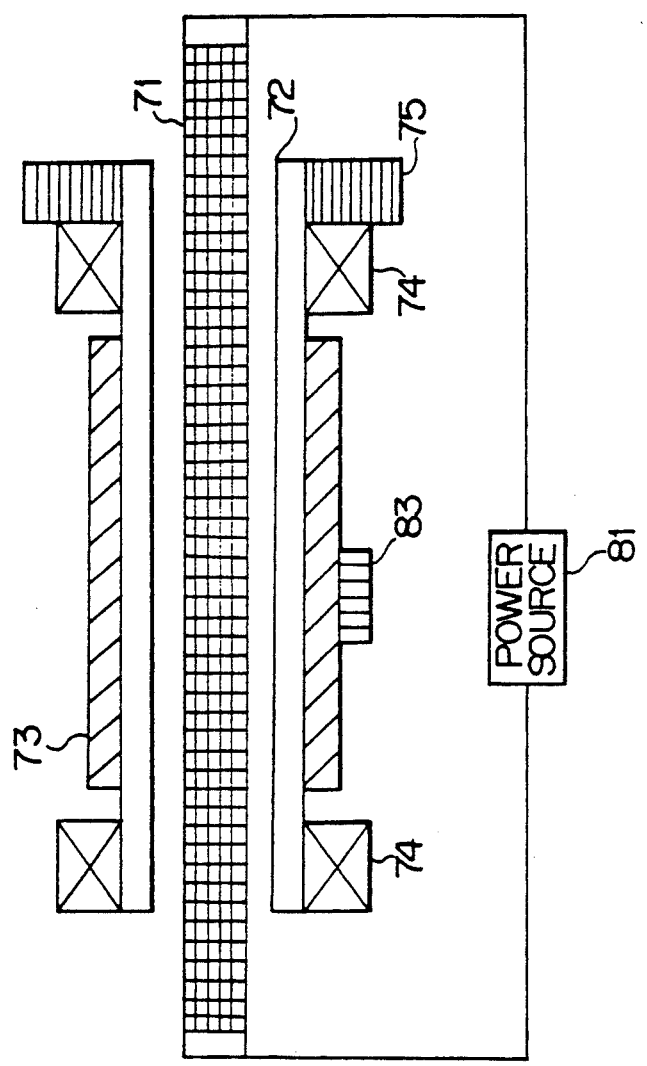
FIG. 4 is a sectional and schematic view of a heat roller in the electronic photo type printer of FIG. 3.

As the fixing unit (7,8 in FIG. 3), a heat roller is widely utilized, and in FIG. 4 a sectional view of the same is shown. In the heat roller method, a heater 71 which is a halogen lamp or the like and a metal roller 72 which includes the heater 71 therein and is rotatable and hollow, are utilized. Since the surface of the hollow metal roller 72 is in direct contact with a toner image that is not fixed on the transferring medium, the surface requires separation and is provided with a coating layer 73 made form fluorine resin. In addition, the inner surface of the hollow metal roller 72 is colored to absorb radiant heat sufficiently from the heater 71.

The hollow metal roller 72 is supported by bearings 74 at the opposite ends thereof and driven by gear 75 or the like. The heater is supplied with electric power, at the ends, from a power source 81.

The temperature of the surface of the heat roller is finely controlled since a change of temperature affects the fixing characteristics. In detail, by a temperature sensing element (thermistor) 83 provided on the surface of the heat roller or near the heat roller, an indication of the sensed temperature is fed back to the power source 81, and the supply and interruption of the electric power to the heat roller is repeated. At that time, sometimes an overshoot occurs generated by the heat capacity of the heat roller and corresponding power consumption by the heater.

The fixing unit, since having a heat roller provided with a heater therein, accordingly consumes the greater part of the power in the electronic photo type printer of the type having a heat roller. For that reason, if many electronic photo type printers are connected to the power source, although the probability is low, some heat rollers of the electronic photo type printers may be supplied with electric power simultaneously. At that instant, if the total current flowing to the printer exceeds the allowable current of the power source, a circuit breaker of the power source is turned OFF, and all the printers supplied with electric power through the breaker stop operating. Many electronic photo type printers output computer information. Since these printers are connected to the same power source, if the power is interrupted, the restoration of the information is impossible or very difficult.

Now, embodiments according to the invention are explained with reference to the drawings.

Figure 1:
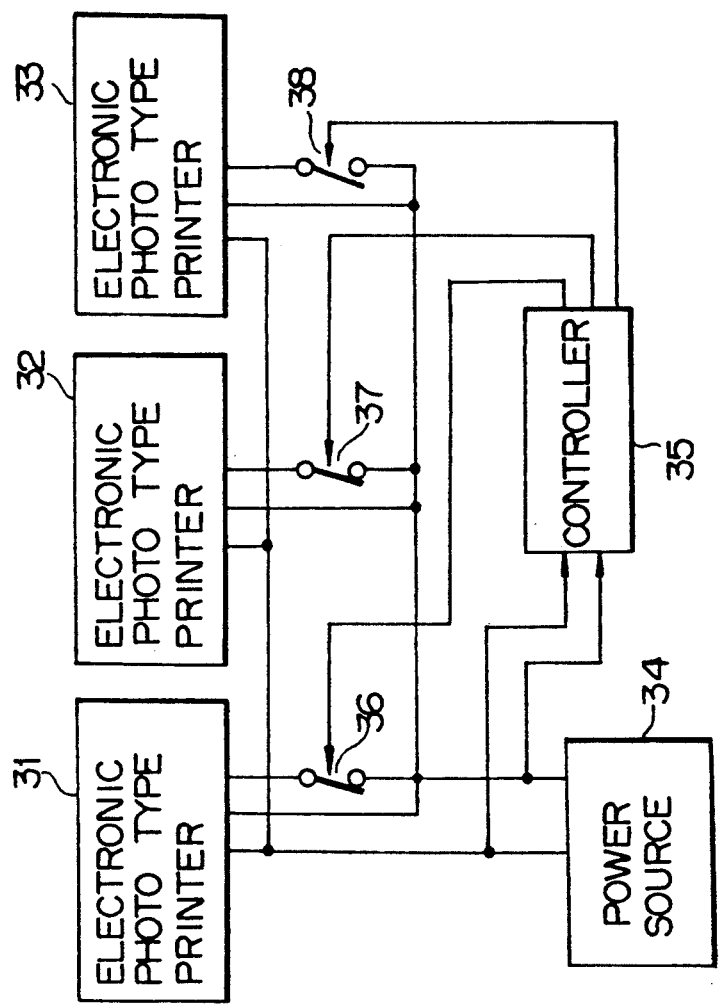
FIG. 1 is a block diagram of a system including a plurality of electronic photo type printers according to an embodiment of the invention.
Figure 5:
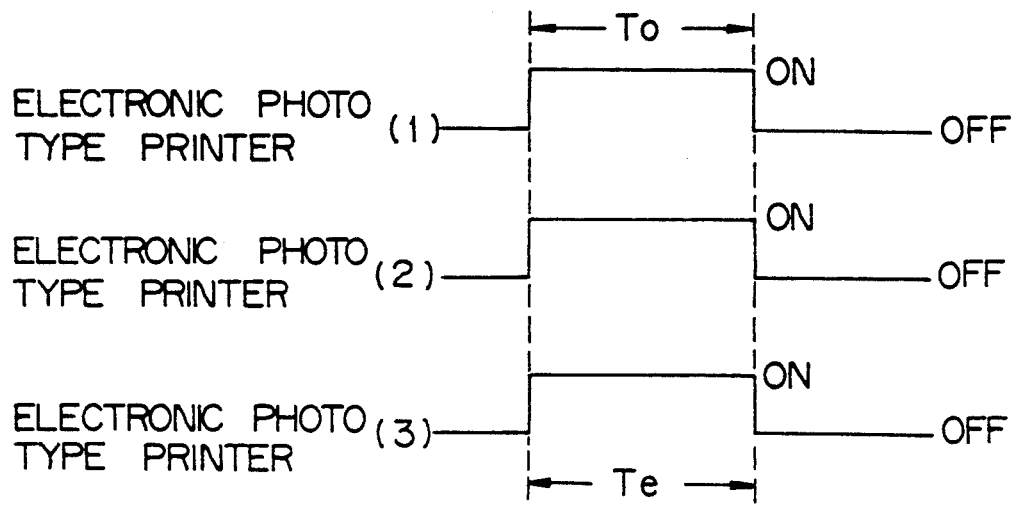
FIG. 5 and FIG. 6 are explanatory diagrams showing the power supply state of a heat roller in each of plural electronic photo type printers in a conventional system.
Figure 6:
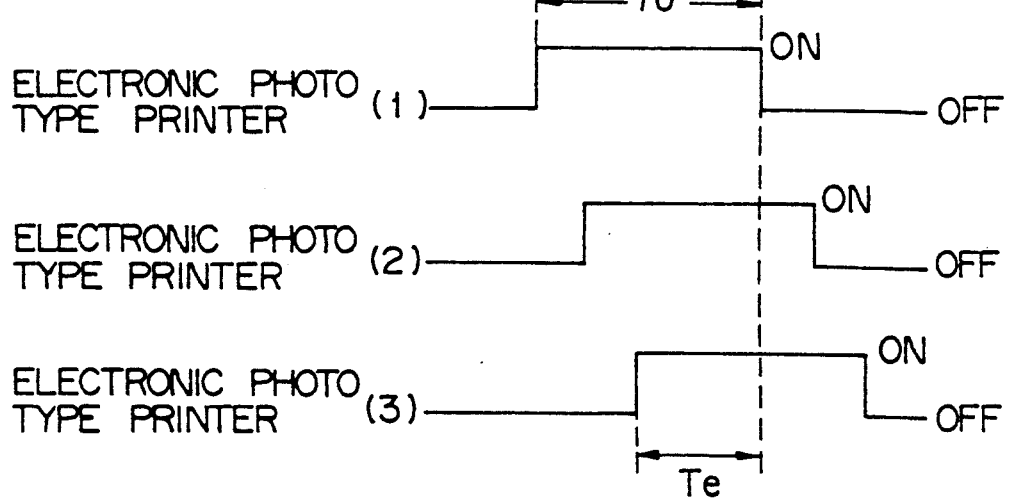

FIG. 1 shows a block diagram of a system including a plurality of processing units according to an embodiment of this invention. For convenience, it is assumed that the three units are identical units and the maximum rated current thereof is 7 amperes. when the heat rollers of the three units are supplied with electric power simultaneously, the system consumes a total current of 21 amperes during time Te (FIG. 5). If the allowable current of the system is assumed to be 15 amperes, the total current requirement of the system exceeds the allowable value, and the power source of the system is disconnected (conf. FIG. 5). If each supplying time is slightly shifted, the time Te is only slightly shortened, and the same state occurs (conf. FIG. 6). In the figure, the time To is the power supplying time required for holding a certain temperature in the heat roller.

Nevertheless, almost all of the maximum rated current is consumed for the heat rollers as already mentioned, and the time, wherein the maximum rated current flows, is short. Namely, when three heat rollers are supplied with electric power simultaneously, the time Te, wherein a current of 21 amperes flows through the system, is short, and the time Te is at most To.

Figure 2:
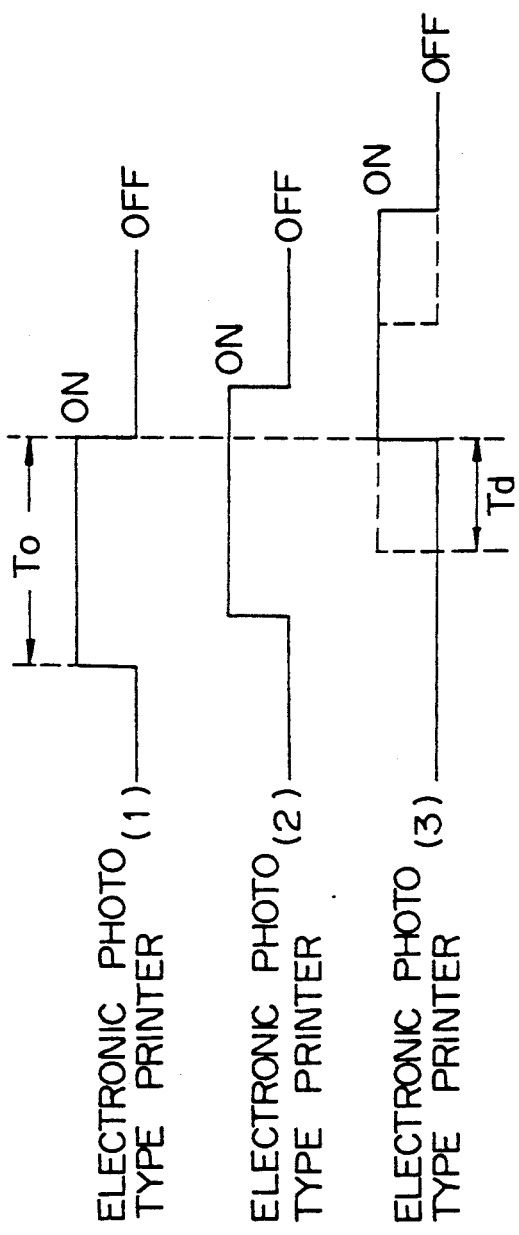
FIG. 2 is an explanatory diagram showing a power supplying state of heat rollers in the respective electronic photo type printers in the system of FIG. 1.

Therefore, as shown in FIG. 2, if one (printer (3)) of the three electronic photo type printers is delayed in the power supplying time by only the time Td (at most To), the total current supplied and consumed in the system does not exceed the allowable current of the power source in the system and the cut off of the power source in the system by the over current condition can be prevented, because the simultaneous supply of power (current) for more than two heat rollers is not executed.

In order to delay the power supply timing for the heat roller in the electronic photo type printer, a measure of the power supply voltage, just before the power is supplied, is taken, because the power source voltage, for a current level near the maximum allowable current, level of the power source, is usually lower than that during a low load. By measuring the voltage drop, the time of the power supply to one or more of plural units is delayed by a certain time and the concentration of the load can be dispersed. The measurement of the voltage drop is performed at each of constant timing intervals, and by repeating these measurements, the delayed power supply to the heat rollers can be assured.

The above aspects are explained with reference to FIG. 1. First, when the system is turned ON, all portions except for the heat roller of the electronic photo type printers 31 to 33 are turned ON. Switches 36 to 38 open initially. When a power supply request is given from the heat roller of the printer 31, a controller 35 measures the voltage of the power source 34, and if the voltage is more than a predetermined value (obtained by experiment or the like), the switch 36 closes and power is supplied to the heat roller of the printer 31. Similarly, the heat roller of the printer 32 is supplied with electric power. Then, when a request for power from the heat roller of the printer 33 is given, the controller 35 measures the voltage of the power source 34. If the voltage now is less than the predetermined value due to the simultaneous supply of power to the heat rollers of printers 31 and 32, the switch 38 remains open and the power supply to printer 33 is delayed. The heat roller switch 36, of printer 31 and which was first turned ON, is turned OFF after the time To, and the voltage of the power source 34 rises to a level greater, or higher, than the predetermined value. The switch 38 of the heat roller of the printer 33 for which the power ON was delayed, then turns ON. The timing of the process is shown FIG. 2.

The heater of each heat roller has a great dash of current at the power ON, and therefore by the timing shift shown in FIG. 2, overloading of the power source can be prevented.

Figure 7:
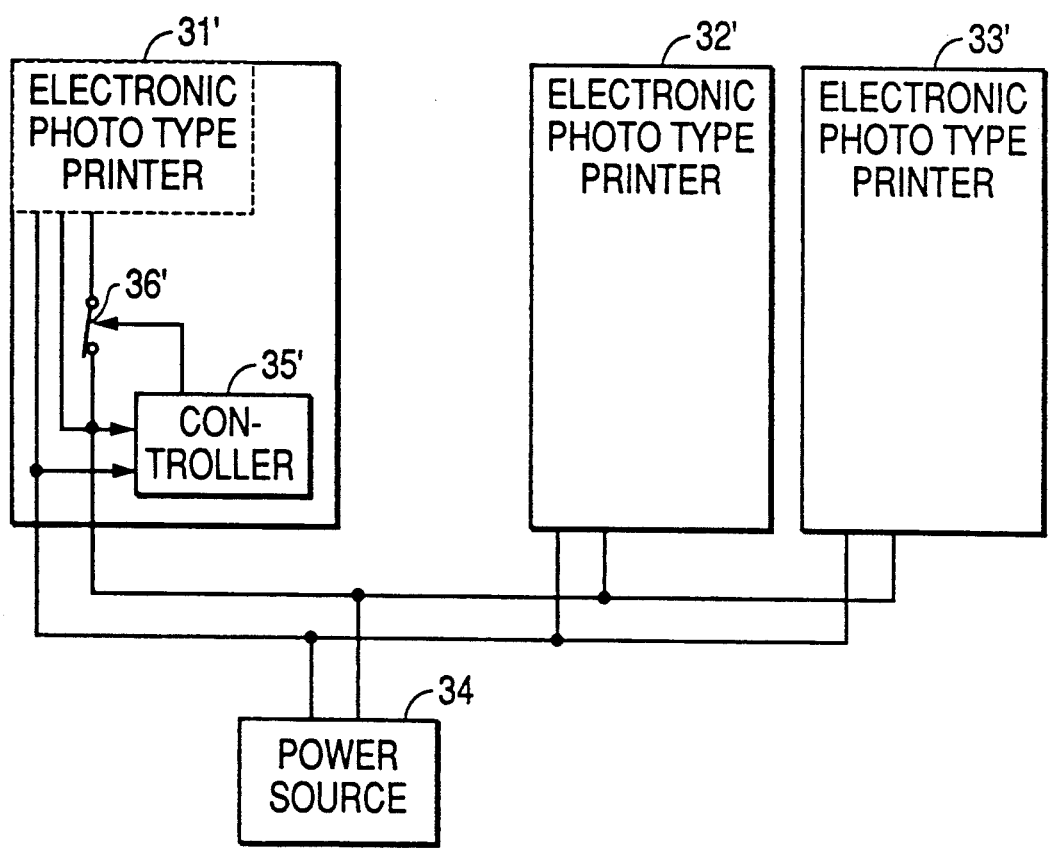
FIG. 7 is a block diagram of a modified embodiment of the system as shown in FIG. 1.

In the system of FIG. 1, special elements (i.e., controller 35 and switches 36, 37 and 38) are added to the system, between the printers 31, 32 and 33 and the power source 34, for the accomplishment of the objects of this invention; however, these elements can be included in each printer, and the purpose of the invention may be performed simply by connecting the printers directly to the power supply. Thus, as shown in FIG. 7, a power source 34 is connected to each of the printers 31', 32' and 33' and further, as shown for the printer 31', included within each thereof is a controller 35' and switch 36'. Also, the number of the printers included in the system is arbitrary. The delay time of the power supplying time can be completed automatically by measuring, or sensing, the increase of the voltage of the power source, or a certain value less than time To can be used as a delay time.

Although the explanation of the disclosed embodiment of the invention involves the application thereof to electronic photo type printersthe processing unit of the invention can be applied to any system comprising plural devices each of which intermittently consumes a great part of the total power source capacity, such as copy machines, facsimiles having a fixing unit, heat ovens and the like.

We claim:

1. A system having a plurality of processing units and a common power source connected thereto for supplying power to the plurality of processing units, comprising:

a plurality of switching means, respectively corresponding to and incorporated in the plurality of processing units and interconnecting the respective plurality of processing units with the common power source, for receiving respective control inputs thereto and selectively being switched thereby to ON and OFF conditions for respectively and selectively supplying power therethrough, or discontinuing the supply of power therethrough, to the respective processing units from the common power source;

a plurality of request means, respectively associated with and incorporated in said plurality of processing units, each operable for determining the requirement for, and correspondingly generating a request for, the selective supply of power from the common power source to the respective processing unit; and a plurality of individual controllers respectively associated with and incorporated in the plurality of processing units, each thereof detecting the power supply condition of the common power source, comparing the detected condition with a predetermined power supply condition and determining, based on the comparison result, an allowable condition permitting the supply of further power from the common power source and a non-allowable such condition, each individual controller further being responsive to a request received from the associated request means of the respective processing unit and in accordance with determining the allowable condition of the common power source, selectively generating and supplying a corresponding control input to the associated switching means for selectively switching said associated switching means to the ON condition thereby to supply power through the associated, selectively switched switching means to the respective processing unit.

2. A system as recited in claim 1, wherein each individual controller selectively generates and supplies a first control input to the associated switching means for switching same to the ON condition for a predetermined time interval and, upon the conclusion of the predetermined time interval, selectively generates and supplies a second control input to the associated switching means to switch same to the OFF condition and thereby to terminate the supply of power therethrough to the respective processing unit.

3. A system as recited in claim 1, wherein the power supply condition is the voltage level of the power supply output of the common power supply and the predetermined condition is a predetermined voltage level, each individual controller determining an allowable condition of the common power supply in accordance with the detected voltage level of the common power supply having a value at least as great as the predetermined voltage level.

4. A system as recited in claim 1, wherein the detected power supply condition is the output current level of the common power supply and the predetermined condition is a predetermined current level, each individual controller comparing the detected, output current level controller predetermined current level and determining an allowable condition in accordance with the detected output current level being less than the predetermined current level.

5. A system as recited in claim 1, wherein each processing unit comprises plural power consuming devices of which one device consumes the greatest amount of power relative to the respective amounts of power consumed by the remaining devices in each processing unit, and wherein:

the plurality of switching means interconnect the common power supply only with the respective, greatest power consuming devices of the plurality of processing units;

the common power supply is connected directly to each of the processing units for supplying electrical power to the remaining devices of each unit; and each individual controller determines an allowable condition and selectively generates and supplies a corresponding control input to the associated switching means for switching same to an ON condition, for supplying power through the associated switching means to the highest power consuming device, only, of the respective processing unit.

6. A system as recited in claim 1, wherein, in response to and following the determination of a non-allowable condition, each individual controller periodically compares the detected power supply condition of the common power supply with the predetermined power supply condition until an allowable condition is detected.

7. A system as recited in claim 1, wherein each individual controller detects the power supply condition of the common power source at constant timing intervals and determines for each received request, individually the corresponding allowable or non-allowable condition of the common power supply, and, upon detecting a non-allowable condition, delays the generation of a control input, corresponding to each such request, to the associated switching means until an allowable condition of the common power supply is determined.

8. A system comprising:

plural processing units, each unit having a maximum rated electrical power requirement and comprising a device which consumes a first portion of the maximum rated electrical power and other components which collectively consume a second portion of the maximum rated electrical power, the first portion comprising almost all of, and the second portion comprising the remainder of, the maximum rated electrical power requirement of the processing units, the device requiring a supply of power on a periodic and thus non-continuous basis and the other components requiring a substantially continuous and non-interrupted supply of power;

an electrical power source having a maximum electrical power output which is less than the total of the respective maximum rated electrical power requirements of the plural processing units but is greater than the total of the respective second portions of the respective maximum rated electrical power requirements of the plural processing units;

the respective, other components of the plural processing units being connected directly to the power source; and each of the plural processing units further having individually and respectively associated therewith;

switching means, connected between the power source and the device, for receiving a control input thereto and selectively being switched thereby to ON and OFF conditions for, respectively, supplying power from the power source to the device and terminating the supply of power form the power source to the device, request means for determining the requirement for, and correspondingly generating a request for, the supply of power from the power source to the device, and controller means for detecting the power supply condition of the power source, comparing the detected condition with a predetermined power supply condition and determining, based on the comparison result, an allowable condition permitting the supply of power from the power source and a non-allowable such condition, the controller means further being responsive to a request received from the request means, and in accordance with determining the allowable condition of the common power source, for selectively generating and supplying a control input to the switching means for selectively switching said switching means to the ON condition thereby to supply power therethrough to the device.

9. A system as recited in claim 8 wherein the controller means detects the voltage level output of the power source and compares the detected voltage level with a predetermined voltage level for determining whether an allowable or a non-allowable condition exists.

10. A system as recited in claim 9 wherein each controller means further comprises:

means for periodically detecting the power supply condition of the power source; and means, respective to the determination of a non-allowable power source condition, for delaying, by a predetermined time delay relative to the receipt of a request, the corresponding generation and supply of a control input to the switching means for selectively switching said switching means to the ON condition.

11. A system as recited in claim 8 wherein each processing unit comprises an electronic phototype printer having a corresponding heat roller and the respective device thereof is the corresponding heat roller thereof.

* * * * *

UNITED STATES PATENT AND TRADEMARK OFFICE
CERTIFICATE OF CORRECTION

PATENT NO. : 5,317,366
DATED : May 31, 1994
INVENTOR(S) : KOSHI et al.

It is certified that error appears in the above-indentified patent and that said Letters Patent is hereby corrected as shown below:

Col. 1, line 47, after "wherein" insert --,--.

Col. 4, line 65, change "printersthe" to --printers, the--;
Col. 6, line 68, change ";" to --:--.

Col. 7, line 6, change "form" to --from--.

Signed and Sealed this

Fifteenth Day of November, 1994

Attest:

BRUCE LEHMAN

Attesting Officer

Commissioner of Patents and Trademarks